(12) United States Patent
Murakami et al.

(10) Patent No.: US 6,318,111 B1
(45) Date of Patent: Nov. 20, 2001

(54) BELT CONVEYOR DEVICE FOR TRANSPORTING COLD FOODS

(75) Inventors: Masaru Murakami; Saburo Aizawa, both of Tokyo (JP)

(73) Assignee: Low Temp. Food Process Technology Co., Ltd., Tokyo (JP)

( * ) Notice: Subject to any disclaimer, the term of this patent is extended or adjusted under 35 U.S.C. 154(b) by 0 days.

(21) Appl. No.: 09/424,926
(22) PCT Filed: Mar. 30, 1999
(86) PCT No.: PCT/JP99/01605
§ 371 Date: Mar. 2, 2000
§ 102(e) Date: Mar. 2, 2000
(87) PCT Pub. No.: WO99/50605
PCT Pub. Date: Oct. 7, 1999

(30) Foreign Application Priority Data

Apr. 1, 1998 (JP) .................................................. 10-105890

(51) Int. Cl.[7] .................................................... F25D 25/04
(52) U.S. Cl. .................................................. 62/380; 62/256
(58) Field of Search ................................ 62/63, 380, 256

(56) References Cited

U.S. PATENT DOCUMENTS

| | | | |
|---|---|---|---|
| 4,078,398 | * 3/1978 | Cloudy | 62/380 |
| 4,337,626 | * 7/1982 | Ibrahim | 62/256 |
| 4,481,782 | * 11/1984 | Murkerjee | 62/63 |
| 5,448,898 | * 9/1995 | Rothstein | 62/380 |
| 5,452,588 | * 9/1995 | Onodera | 62/63 |
| 5,606,861 | * 3/1997 | Renz | 62/63 |

* cited by examiner

Primary Examiner—Ronald Capossela
(74) Attorney, Agent, or Firm—Crowell & Moring LLP

(57) ABSTRACT

A belt conveyor device for transporting cold foods capable of controlling the quality and sanitation of foods, without requiring the necessity of cooling a whole processing room and without being affected by an environmental temperature, by forming cooling spaces only in the food transporting spaces of a conveyor for processing and transporting cold foods. Wherein cold air outlets and cold air suction ports are provided on the right and left sides of the transporting spaces of the belt conveyor opposedly to each other across the belt conveyor, cooling parts are provided in spaces sandwiched between the upper and lower sides of the running belt, food transporting spaces on the surfaces of the belt conveyor in a working space are formed, by a cool air flow from the cold air outlets to the cold air suction ports, into the cooled spaces having temperatures equivalent to a food refrigerating temperature of approx. 10-C. or below which is lower than the temperature in the working space, and cool air is injected against the rear surface of the belt so as to cool the rear surface of the belt.

5 Claims, 4 Drawing Sheets

BELT CONVEYOR DEVICE FOR TRANSPORTING COLD FOODS

FIELD OF THE INVENTION

The present invention relates to a belt conveyor device for transporting cold foods, which is used in handling food transportation of food material in a food products plant, such as a meat and marine products processing plant.

PRIOR ART

In a foods processing site requiring processing in a low-temperature state, when considering the working environment, it was inevitable for a room to have a relatively high temperature of around 15-C.~20-C., and while transporting cold foods by using a belt conveyor etc. arranged in a room, workers at processing tables placed on both left and right sides of the belt conveyor, took out food from the belt conveyor, and returned it back to the said belt conveyor after performing the designated processing.

In a cold foods processing site of this type, although it is required to keep processed food below 10-C., there have been following problems: In a conventional food products processing plant, since it is necessary to form cooling spaces which maintain a refrigerating temperature of 10-C. or below to preserve freshness of foods in working spaces, a large scale air conditioning installment was required, which made a problem of energy conservation. Also, an excessively cooled environment was an unnatural working environment for workers, and not only was it an impediment to work efficiency, but it was also a problem concerning the worker health.

Furthermore, thermal management of working spaces was inadequate, and if the temperature rose beyond the designated temperature, there was a problem of quality and sanitation.

The object of the present invention is made to resolve such ever existing problems, by enabling control of the quality and sanitation of foods without being affected by an environmental temperature, by cooling the belt conveyor surface which processes and transports foods, while a food transporting space of the belt conveyor surface in a working space is formed to be a cooling space of 10-C. or below.

SUMMARY OF THE INVENTION

To accomplish the above mentioned technological subject, the present invention is comprised as the following:

The first embodiment of the present invention comprises a belt conveyor which endlessly revolves over a driving drum and a follower drum; a cooling part which forms cold air; cold air outlets which connects to the said cooling part by its inlet side, provided on the side face of the food transporting spaces on said belt conveyor; cold air suction ports which connects to said cooling part by its outlet side, provided oppositely to the said cold air outlets, sandwiching the food transporting spaces of said belt conveyor, and is characterized in that food transporting spaces on the surfaces of the belt conveyor in a working space are formed to be approx. 10-C. or below, which is lower in temperature than the working space, by a cool air flow from said cold air outlets to the cold air suction ports, more specifically, a cooling space having temperatures set to be equivalent to a food refrigerating temperature of around 0~10-C. is formed.

There may be a construction in which a cold air injector, with an inlet side connecting through with said cooling part, is provided at a position confronting rear surfaces of said conveyor, and by blowing cold air against the rear surfaces of said belt conveyor with said injector, the rear surface spaces of said conveyor is formed as cooling spaces.

There may be a construction in which air outlets and air suction ports are provided on an upstream and downstream side of the running direction of a conveyor, oppositely to each other across the conveyor, and by an air flow, from said outlets to the suction ports as an air-curtain, cooling spaces of the food transporting spaces of said conveyor is substantially blocked in temperature from the working spaces.

Particularly, if this is not provided, cold air of the cooling spaces upon a conveyor will flow outside from both ends, and a thickness of the cooling spaces of a conveyor will not be maintained.

There may be a construction in which a cold air circulation path is provided, in which cold air from said cooling part blows out into cooling surfaces, formed on both the top and rear surfaces of said conveyor, and cold air blown out into cooling surfaces returns to the cooling part through designated suction ports, and an air-quantity controlling system, which adjusts cold air-quantity, are set at optional points of said circulation path.

Figure 1:
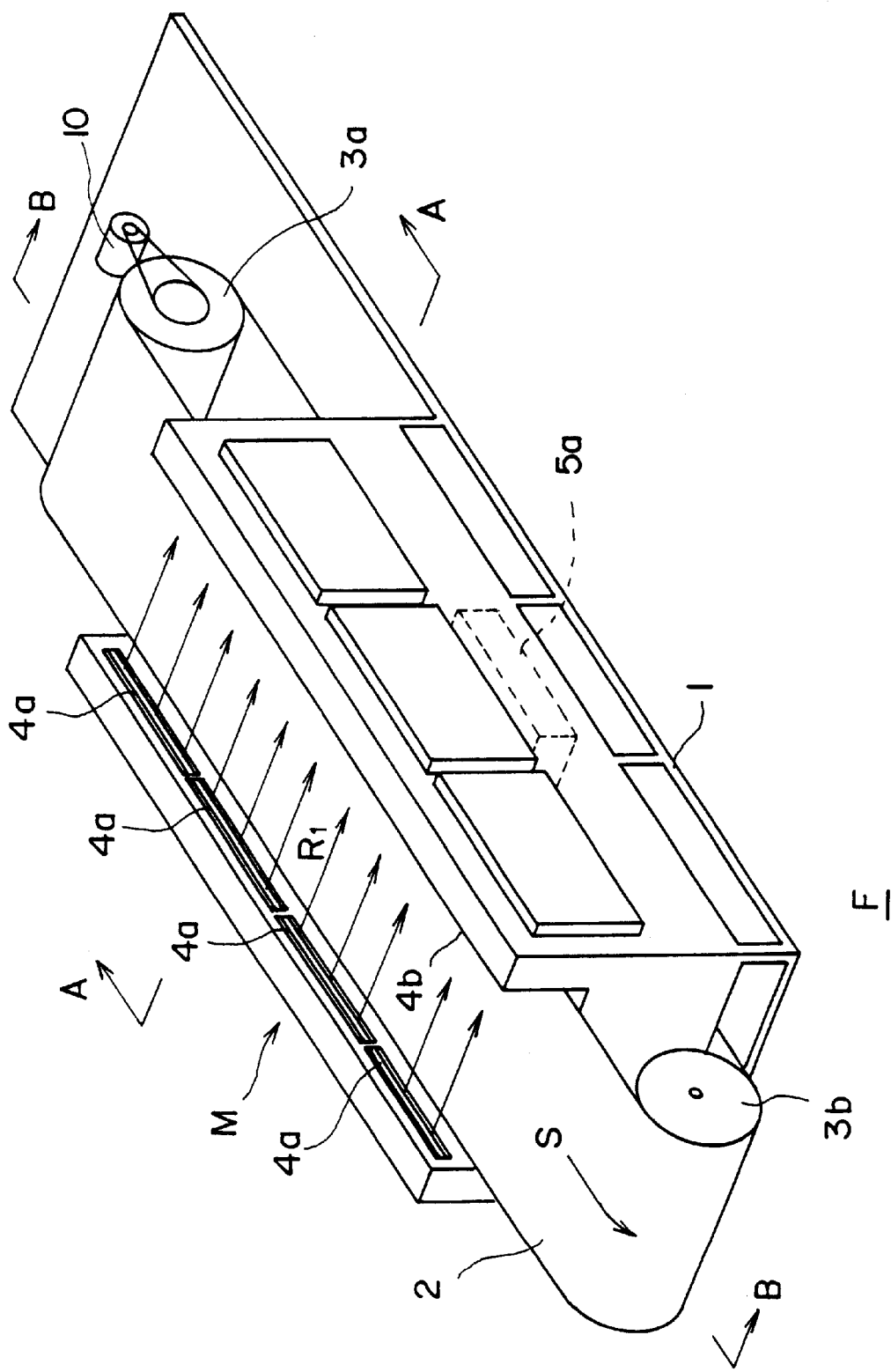
FIG. 1 is a perspective view of a belt conveyor device for transporting cold foods, which is the first embodiment of the present invention.

In the drawings described above, reference numeral 2 denotes a belt conveyor, 4a cold air outlets, 4b cold air suction ports, 5 a cooling port, 14a and 15a air outlets, 14b and 15b air suction ports, M a belt conveyor device for transporting cold foods, $R_1$ and $R_2$ cooling spaces, P room temperature spaces.

DETAILED DESCRIPTION OF THE PREFERRED EMBODIMENTS

Preferred embodiments of the present invention, a belt conveyor device for transporting cold foods, will now be explained in detail with reference to the appended drawings. It is intended, however, that the measurements, material, and configuration of component parts and their relative positions and the like in the following description and in the drawings shall be interpreted as illustrative only not as limitative of the scope of the present invention.

Figure 2:
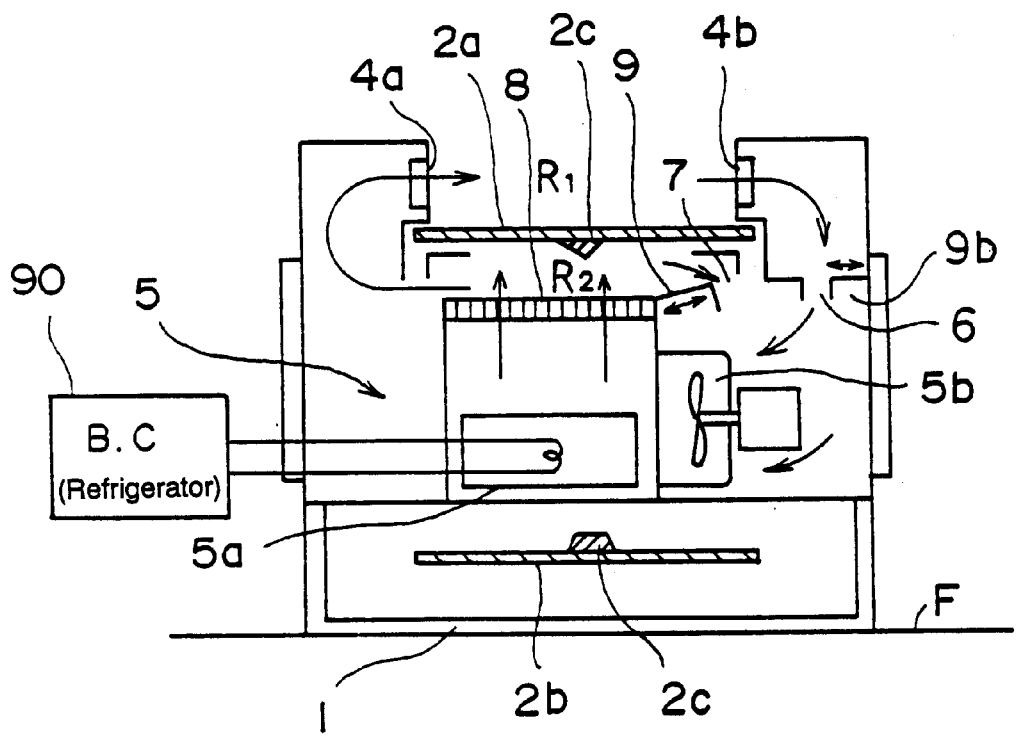
FIG. 2 is a schematic cross-sectional view taken in the direction of the arrows substantially along the line A—A of FIG. 1.
Figure 3:
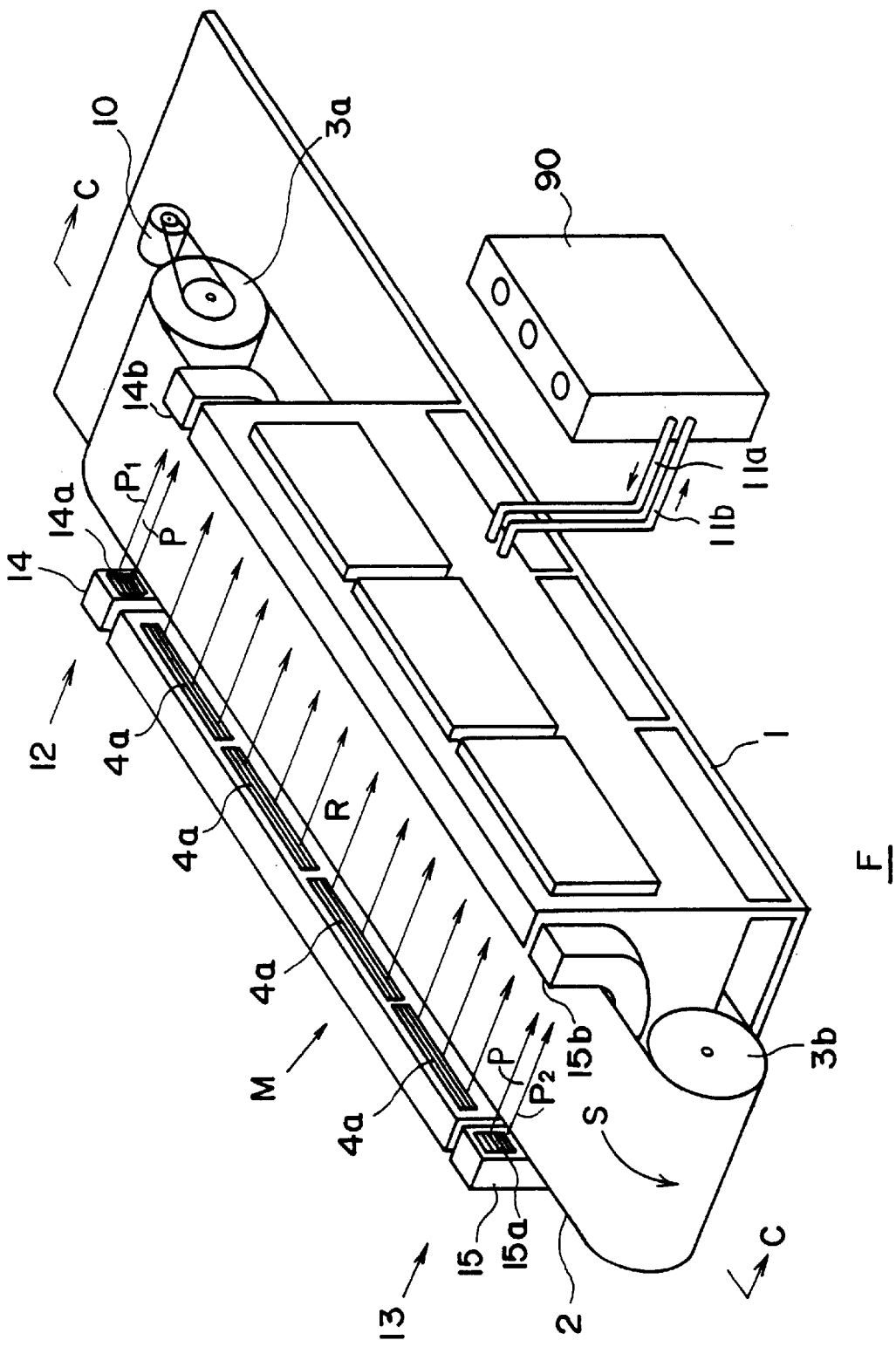
FIG. 3 is a perspective view of a belt conveyor device for transporting cold foods, which is the second embodiment of the present invention.
Figure 4:
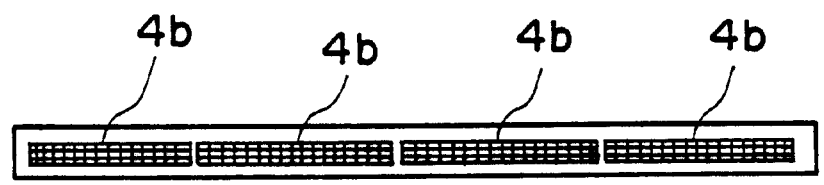
FIG. 4 is a sketch taken in the direction of the arrows substantially along the line B—B of FIG. 1.
Figure 5:
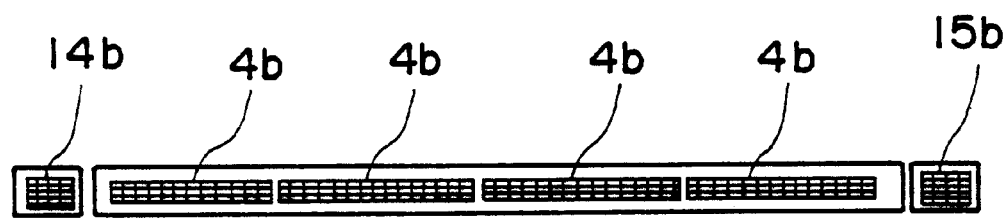
FIG. 5 is a sketch taken in the direction of the arrows substantially along the line C—C of FIG. 3.

FIG. 1 denotes a perspective view of a belt conveyor device for transporting cold foods, concerning the first embodiment of the present invention, and FIG. 2 denotes a schematic cross-sectional view taken in the direction of the arrows substantially along the line A—A of FIG. 1. FIG. 3 denotes a perspective view of a belt conveyor device for transporting cold foods, concerning the second embodiment of the present invention. FIG. 4 denotes the configuration of the cold suction ports of the present invention, and a sketch taken in the direction of the arrows substantially along the line B—B of FIG. 1. FIG. 5 denotes the configuration of the air suction ports of the present invention, and a sketch taken in the direction of the arrows substantially along the line C—C of FIG. 3. In the drawings, reference numeral M denotes a belt conveyor device for transporting cold foods, concerning the embodiments of the present invention.

(First Embodiment)

In FIG. 1, FIG. 2, and FIG. 4, a belt conveyor device for transporting cold foods M is provided on working floor F by stand 1, and has cold air outlets and cold air suction ports provided on both left and right sides of the food transporting spaces, which are positioned along both sides of belt transporting direction S on the conveyor, and which are capable to block off room temperature of the above working space by forming cooling spaces $R_1$, which is equivalent to a food refrigerating temperature of 10-C. or below. Stand 1 supports belt conveyor 2. Belt conveyor 2 is comprised of a belt or mesh-shaped endless belt made of stainless steel, and is driven by drums 3a and 3b, provided on both ends of stand 1. Stainless steel was applied in belt conveyor 2, however, other metals of synthetic resin and the like may be used. To prevent fluctuation of the rear surface of the belt conveyor 2, whenever necessary, on the surface of the internal circumference of the rear surface side of the conveyor, a rope-shaped projection 2c, which has a V-shaped cross section, fits with the guide trench, and orbits the surface of the circumference of a drum. As for a rotation axis of drum 3a, it is comprised so as to provide rotational force of motor 10 through a pulley and a belt.

Cold air outlets 4a and suction ports 4b are provided on the right and left sides parallel to the transporting direction of the conveyor, opposedly to each other across the food transporting spaces of a belt conveyor 2. Then, as shown in FIG. 1 and FIG. 4, said cold air outlets 4a and suction ports 4b are formed as to appear as many grill-shaped, or several slits of belt-shaped openings. Meanwhile, at a position confronting rear surfaces of a conveyor, which is positioned in a rear surface space on the opposite side of the top surfaces of belt conveyor 2, an injecting slit 8, formed of many slit openings, and extending along the conveyor transporting direction, is provided, enabling cold air from below blow against a rear surface of a conveyor.

Therefore, a cooling part is comprised with a ventilator 5b and a cooling part 5, provided in a space below injection slit 8, which is in a storage space sandwiched between upper belt conveyor 2a and lower belt conveyor 2b, and by either making cooling part 5 function as a coolant evaporator which forms a refrigerating cycle with a compressor provided within or out the transporting device, or by making cooling part 5 function as a brine heat exchanger 5a which is supplied with coolant from a refrigerator within or out of the device.

And cold air, cooled by a coolant evaporator of a cooling part 5 or a brine heat exchanger 5a, is sent by ventilator 5b to cold air outlets 4a, which is connected through with cooling space $R_2$ formed by injection slit 8, and forms cooling space $R_1$ by covering a transporting space on the surface of belt conveyor 2, and along with circulating through cavity 6 by being sucked in by air suction ports 4b, circulates through a path connecting through cavity 7, which connects with ventilator 5b from said cooling space $R_2$. Therefore, a cooling space $R_1$, cooled below 10-C., along cold foods transporting direction S on the surface of belt conveyor 2, is formed, and also a rear surface of belt conveyor 2 is cooled to a temperature below 10-C., by a collision of cold air, forming a cooling space $R_2$.

Accordingly, food-transporting spaces on a surface of a belt conveyor 2 maintains a designated temperature by being blocked of an environmental temperature above, by said cooling space $R_1$.

Also, whenever necessary, by changing an opening of cavities 6 and 7 by an air-quantity control system such as a control plate 9a and 9b, a temperature of cooling spaces $R_1$ and $R_2$ may be controlled by controlling each cold air-quantity of each path leading to ventilator 5b, from injecting slit 8, and through cavities 6 and 7.

For example, in a freezing cooling device, (not shown in drawing) cold foods cooled to a designated temperature is transported on a belt conveyor 2, and a worker near a belt conveyor 2 will take out transported cold food upon belt conveyor 2. During this time, since cooling spaces $R_1$ and $R_2$, a surface and rear surface of belt conveyor 2, are cooled at all times by cold air, and the transporting spaces on which cold foods are set are blocked in temperature of an environmental temperature, the cold top surfaces of a conveyor are maintained to be at a cold temperature equivalent to a refrigerating temperature of below 10-C. at all times. Further, 90 of FIG. 2 is either a brine cooler which supplies cold brine to brine heat exchanger 5a, or a refrigerator, which makes coolant evaporator 5a become a part of a refrigerating cycle.

In accordance with this embodiment, an assembly line operation of processing cold foods may be implemented by maintaining a designated temperature, and in an extremely sanitary manner. Further, since workers may work under an environment of room temperature, it enables workers to work comfortably. Furthermore, since only a limited space surrounding the belt conveyor requires cooling, it is possible to make do with small cooling equipment.

(Second Embodiment)

FIG. 3 and FIG. 5 shows a belt conveyor device for transporting cold foods, concerning the second embodiment of the present invention. In the second embodiment shown in FIG. 3 and FIG. 5, like the first embodiment, a belt conveyor device for transporting cold foods M is provided on working floor F by stand 1, and has cold air outlets 4a and cold air suction ports 4b provided on both left and right sides of the transporting spaces, extending along a transporting direction S. Stand 1 supports belt conveyor 2. Belt conveyor 2 is made of stainless steel, comprising an endless belt fixed with a rope-shaped projection 2c, which has a V-shaped cross section, to prevent fluctuation of the rear surface, and is driven by drums 3a and 3b provided on both ends of stand 1. Through a pulley and a belt, a rotational force of motor 10 is provided to a rotation axis of drum 3a. Cold air outlets 4a and suction ports 4b are provided opposedly to each other across the transporting spaces of a belt conveyor 2. Cold air outlets 4a and suction ports 4b are formed to appear as many grill-shapes or slit-shapes. Also, like the first embodiment, an injecting slit 8, which blows cold air against a rear surface of belt conveyor 2a, is set in a storage space positioned on a rear surface of the top surface of belt conveyor 2. Whereas in the first embodiment, a cooling part 5 was comprised by coolant evaporator 5a and ventilator 5b, in the present embodiment, a cooling part 5 is comprised by a ventilator 5b and a cold brine heat exchanger 5a, which is supplied with cold brine via brine feeding path 11a, from brine cooler 90 outside belt conveyor 2. By ventilating cold air, cooled in cold brine heat exchanger 5a of cooling part 5 and through ventilator 5b, to said rear surface space between a belt conveyor 2a of a upper side and belt conveyor 2b of a lower side, cooling spaces $R_1$ and $R_2$ are formed on both upper and lower sides (top surface and rear surface) sandwiching said upper side of belt conveyor 2. Coolants such as anti-freezing fluid, ethylene glycol, and propylene are used as cold brine. Further, by forming room temperature spaces P at upstream end section 12 and downstream end section 13, which is formed by circulating air circuit $P_1$ and $P_2$, and by interpositioning room temperature spaces P between a starting end section of conveyor transporting direction 12, and a terminal section of a conveyor transporting direction 13 of a cooling spaces $R_1$, which is formed in said transporting spaces, blocks the outside air of environmental spaces, and enables maintaining transporting spaces $R_1$ to be at a designated cooling spaces temperature, more efficiently than the said first embodiment. In this case, a circulating air circuit $P_1$ which forms the aforesaid room temperature spaces P, is a path at a starting end section 12 of a belt conveyor 2, with air outlets 14a and suction ports 14b, and is provided opposedly across a belt conveyor 2, and connects through at a rear surface of belt conveyor 2 by duct 15.

A circulating air circuit $P_2$ is also provided at the terminal section 13 of the belt conveyor 2. That is, air outlets 15a and suction ports 15b are positioned opposedly across a belt conveyor 2, and are set so as to connect through at a rear surface of a belt conveyor 2 by duct 15. As shown in FIG. 5, air inlets 14b and 15b are formed to appear as many grill-shapes or slit-shapes, like said cold air inlets 4b. A ventilator (not shown in drawing) is positioned at each circulating air circuit $P_1$ and $P_2$, and air ventilated from air outlets 14a and 15a are sucked in at each suction ports 14b and 15b, and by forming room temperature space P in a starting end section 12 and terminal section 13 of belt conveyor 2, cold air of cooling spaces $R_1$ is blocked from outside air. Also, by a temperature inclination of outside air and cooling spaces $R_1$, caused by forming a room temperature spaces P, a development of dew condensation between cooling spaces $R_1$ is prevented.

For example, like mentioned above, cold foods is transported on belt conveyor 2, and a worker near a belt conveyor 2 will take out cold foods upon belt conveyor 2. During this time, a cooling spaces $R_1$ and $R_2$ on the top and under surface of belt conveyor 2 is cooled at all times by cold air from refrigerator 5, and cold foods on belt conveyor 2 are maintained at a designated temperature. Also, by forming room temperature spaces P at starting end section 12 and terminal section 13 of a belt conveyor 2, outside leakage of cold air of cooling spaces $R_1$ lessened, and as well as preventing a temperature rise of said cooling spaces, a development of dew condensation at the border of outside air and cooling spaces is prevented.

Therefore, an assembly line operation of processing of cold foods may be sanitarily implemented, under a stable low temperature. Further, since workers may work under an environment of room temperature, it enables workers to work comfortably. Furthermore, since only limited cooling spaces, which is of above and below a belt conveyor, requires cooling, it is possible to make do with a small cooling equipment. Also, since there are few outside leakage of cold air of cooling spaces $R_1$, it is effective for energy conservation.

Effects of the Invention

As described above, according to the present invention, cold foods cooled to a designated temperature may be processed and transported in a state of controlled quality and sanitation, since it is not affected by environmental temperature, and is transported within spaces in a cooled state, which is formed to be a cooled temperature below 10-C., by a blow-out of cold air and a conveyor surface which is cooled from its rear surface.

Also, it is not necessary to maintain a low environmental temperature of a belt conveyor, using a great amount of energy, and even in such places as outdoors, where a low environmental temperature of a belt conveyor is unable to be maintained, a control system, of maintaining quality without being affected by an environmental temperature while transporting cold foods, is provided.

Further, by using cold brine heat exchanger at a cooling part, cold air at a low temperature may be easily produced, even when under normal environmental temperature, and processing under low temperature may be easily automated.

Furthermore, by providing room temperature spaces by a circulating air circuit of room temperature air at a starting end section and a terminal section, a temperature rise of cooling spaces may be prevented by a low outside leakage of cold air from cooling spaces. Also, a development of dew condensation at a border of cooling spaces and outside air may be prevented.

Moreover, since only cooling spaces surrounding the belt conveyor require cooling, workers may work under an environment of room temperature, and enables a reduction of an excess load to workers, as an excessively cooled working space. Also, it enables a contribution to energy conservation.

What is claimed is:

1. A belt conveyor device for processing cold foods being installed in a working space having a normal temperature higher than approximately 15° C. which is appropriate for workers to operate, and having side positions where the workers can operate to process the foods, comprising:

a belt conveyor which endlessly revolves over at least two drums, operating space to enable workers to process the foods on the belt conveyor by opening an upper part of said conveyor; and a cooling part which forms cold air and is connected to cold air outlets by an inlet side and cold air suction ports by an outlet side, said cold air outlets and said cold air suction ports being provided opposite each other at positions having a food transporting space on a surface of said conveyor therebetween and being located on both lateral sides of the conveyor, wherein the food transporting space on the surface of the conveyor, the upper part of the conveyor being opened for the operating space, is maintained at a temperature lower than a temperature of the operating space, said food transporting space temperature being at a cold storage temperature higher than the freezing point and lower than approximately 10° C. by flowing cold air through the food transporting space between the cold air outlets and the cold air suction ports with the cooling part.

2. A belt conveyor device for processing cold foods according to claim 1, wherein a cold air injector, with an inlet side connecting to said cooling part, is provided at a position confronting inner surfaces of said conveyor, and by blowing cold air against the inner surfaces of said belt conveyor with said injector, inner surface spaces of said conveyor form cooling spaces with temperatures from the freezing point to 10° C.

3. A belt conveyor device for processing cold foods according to claim 2, wherein an air quantity controlling system is set at optional points of a cold air circulation path, and is installed either between said cold-air forming cooling part and said cold air outlets, or between said cooling part and said cold air inlets.

4. A belt conveyor device for processing cold foods according to claim 2, wherein normal temperature air outlets and normal temperature air suction ports are provided at upstream and downstream ends of a running direction of the belt conveyor opposite to each other across the belt conveyor, and by an air flow, from said normal temperature air outlets to the normal temperature air suction ports as an air-curtain, cooling spaces of the food transporting spaces of said belt conveyor are substantially blocked from the normal temperature from the working space.

5. A belt conveyor device for processing cold foods according to claim 1, wherein normal temperature air outlets and normal temperature air suction ports are provided at upstream and downstream ends of a running direction of the belt conveyor opposite to each other across the belt conveyor, and by an air flow, from said normal temperature air outlets to the normal temperature air suction ports as an air-curtain, cooling spaces of the food transporting spaces of said belt conveyor are substantially blocked from the normal temperature from the working space.

* * * * *